(12) United States Patent
Bjorstrom et al.

(10) Patent No.: US 7,489,476 B1
(45) Date of Patent: Feb. 10, 2009

(54) HEADLIFT FOR DISK DRIVE HEAD SUSPENSION

(75) Inventors: Jacob D. Bjorstrom, Hutchinson, MN (US); Justin M. Eggert, Dassel, MN (US); Brett L. Haugen, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 442 days.

(21) Appl. No.: 10/992,046

(22) Filed: Nov. 18, 2004

Related U.S. Application Data

(60) Provisional application No. 60/520,932, filed on Nov. 18, 2003.

(51) Int. Cl.
G11B 5/54 (2006.01)
G11B 21/12 (2006.01)

(52) U.S. Cl. ...................... 360/245; 360/255
(58) Field of Classification Search ............. 360/244.2, 360/244.3, 244.4, 244.5, 244.8, 244.9, 245, 360/245.3, 245.5, 245.7, 254.7, 254.8, 255
See application file for complete search history.

(56) References Cited

U.S. PATENT DOCUMENTS

| | | | | |
|---|---|---|---|---|
| 5,027,241 | A * | 6/1991 | Hatch et al. .................. | 360/255 |
| 5,291,359 | A | 3/1994 | Wolter | |
| 5,339,208 | A | 8/1994 | Yumura et al. | |
| 5,428,489 | A * | 6/1995 | Takamure et al. ........ | 360/244.2 |
| 5,463,514 | A | 10/1995 | Yaeger | |
| 5,471,734 | A | 12/1995 | Hatch et al. | |
| 5,526,206 | A | 6/1996 | Shimizu | |
| 5,572,387 | A | 11/1996 | Brooks et al. | |
| 5,875,070 | A | 2/1999 | Khan et al. | |
| 6,151,197 | A * | 11/2000 | Larson et al. ............... | 360/255 |
| 6,157,520 | A | 12/2000 | Mangold et al. | |
| 6,172,853 | B1 * | 1/2001 | Davis et al. .............. | 360/245.7 |
| 6,239,953 | B1 * | 5/2001 | Mei ........................ | 360/294.6 |
| 6,362,933 | B1 | 3/2002 | Sampietro et al. | |
| 6,407,889 | B1 | 6/2002 | Khan et al. | |
| 6,424,498 | B1 * | 7/2002 | Patterson et al. ......... | 360/245.7 |
| 6,538,850 | B1 * | 3/2003 | Hadian et al. ............ | 360/245.7 |

(Continued)

FOREIGN PATENT DOCUMENTS

JP     2000011571     1/2000

(Continued)

*Primary Examiner*—Brian E Miller
(74) *Attorney, Agent, or Firm*—Faegre & Benson LLP

(57) ABSTRACT

A headlift on a distal end of a load beam of the type for use in a disk drive suspension, including two distally extending rails transversely spaced from each other, a cross member extending between the first and second rails, and a tab extending from the cross member. The headlift may include arms extending transversely from each rail that engage with each other and with an offset formed in the load beam. In one embodiment, the headlift is integrally formed from the same piece of material as the headlift. In a second embodiment, the headlift is formed from a polymer and attached to the load beam. The method of manufacture, in one embodiment, includes providing a unitary flat load beam member and folding the load beam member and attaching portions of the headlift to the load beam to form the headlift. Alternatively, the load beam may be formed with a structural surface that interfaces with a mounting portion of the headlift.

7 Claims, 13 Drawing Sheets

U.S. PATENT DOCUMENTS

| | | | |
|---|---|---|---|
| 6,556,382 B1 * | 4/2003 | Tangren | 360/244.8 |
| 6,611,402 B1 * | 8/2003 | Mangold | 360/255 |
| 6,723,931 B2 * | 4/2004 | Marek et al. | 200/16 D |
| 6,804,087 B2 * | 10/2004 | Wobbe et al. | 360/245 |
| 6,989,968 B2 * | 1/2006 | Takasugi et al. | 360/244.2 |
| 7,085,104 B1 * | 8/2006 | Hadian et al. | 360/245.7 |
| 7,230,798 B2 * | 6/2007 | Hashi et al. | 360/244.2 |
| 2001/0001256 A1 * | 5/2001 | Hsiao | 360/246.6 |
| 2002/0034039 A1 * | 3/2002 | Hagen | 360/97.01 |
| 2003/0039074 A1 * | 2/2003 | Erpelding | 360/244.2 |
| 2004/0008449 A1 * | 1/2004 | Girard | 360/245.7 |
| 2004/0095681 A1 * | 5/2004 | Takasugi et al. | 360/244.2 |
| 2004/0184193 A1 * | 9/2004 | Honda et al. | 360/244.2 |
| 2005/0219757 A1 * | 10/2005 | Suzuki et al. | 360/244.2 |
| 2005/0237670 A1 * | 10/2005 | Fujimoto et al. | 360/244.2 |
| 2006/0250725 A1 * | 11/2006 | Tada et al. | 360/244.2 |

FOREIGN PATENT DOCUMENTS

| | | |
|---|---|---|
| KR | 98004812 | 3/1998 |

* cited by examiner

HEADLIFT FOR DISK DRIVE HEAD SUSPENSION

REFERENCE TO RELATED APPLICATION

This application claims the benefit of U.S. Provisional Application Ser. No. 60/520,932, filed on Nov. 18, 2003 and entitled Suspension Assembly With Headlift And Method For Making The Same, which is incorporated herein in its entirety.

FIELD OF THE INVENTION

This invention relates generally to disk drive head suspensions. In particular, the invention is a headlift structure and method for manufacturing a head suspension.

BACKGROUND OF THE INVENTION

Headlifts are well known components or features of disk drive head suspensions. Briefly, in some applications the headlift is used only during manufacturing operations to merge the suspension into place with respect to the disk. In other applications, the headlift is engaged and used by other structures of the disk drive during its operation to load the suspension onto and unload the suspension from the spinning disk. Headlifts and related structures are disclosed, for example, in Japanese patent document no. 2,000,011,571, South Korean patent document no. 98,004,812 and in the following U.S. patent documents.

| Inventor | U.S. Pat. No. |
| --- | --- |
| Wolter | 5,291,359 |
| Yaeger | 5,463,514 |
| Shimizu | 5,526,206 |
| Mangold et al. | 6,157,520 |
| Mei | 6,239,953 |
| Sampietro et al. | 6,362,933 |
| Ray et al. | 6,463,514 |
| Hadian et al. | 6,538,850 |

There remains a continuing need for improved headlift structures for disk drive suspensions. In particular, there is a need for headlifts that are stiff, but provide little, if any, detrimental impact on the resonance characteristics of the suspension. To be commercially viable, any such headlift should be capable of being efficiently manufactured.

SUMMARY OF THE INVENTION

The present invention is a headlift for use in a disk drive suspension. In one embodiment, the present invention is a headlift located on a distal end of a load beam of the type for use in a disk drive suspension. The headlift comprises a first distally extending rail and a second distally extending rail transversely spaced from the first rail. The headlift further comprises a cross member attached to and extending between the first and second rails and a tab extending distally from the cross member. In one embodiment, the headlift further includes a first arm extending transversely from a proximal portion of the first rail and a second arm extending transversely from a proximal portion of the second rail that engages the first arm. The invention can also include an offset in the load beam that engages with the first and second arms. The load beam and headlift can be formed from the same piece of material.

In a second embodiment, the present invention is a disk drive suspension comprising a flexure, a headlift and a load beam. The load beam is mounted to the flexure and includes a headlift mount for receiving the headlift. The headlift mount enables the headlift to move between a retracted position with the distal end of the headlift positioned proximally with respect to the distal end of the flexure and an extended position with the distal end of the headlift positioned distally with respect to the distal end of the flexure. The headlift can have an offset so that a distal end of the headlift has a different plane than portions of the proximal end.

In a third embodiment, the present invention is a disk drive suspension, comprising a flexure, a load beam, a headlift, and a headlift tab. The load beam includes a structural surface and the headlift includes including a mounting portion engaged with the structural surface on the load beam. The headlift is formed from a polymer. The structural surface can include a grid of load beam material to accept a rivet or to allow polymer material to flow through it to secure the headlift to the load beam.

In a fourth embodiment, the present invention is a disk drive suspension comprising a flexure, a load beam and a beam member. The load beam includes a load point that interfaces with the flexure. The beam member extends distally from the load beam and includes distal end that extends distally from the flexure. The width of the beam member is less than the width of the distal end of the load beam.

In a fifth embodiment, the present invention provides a method for forming a headlift integral to a suspension load beam for a disk drive suspension. The method includes providing a unitary flat load beam member from which the load beam and headlift can be formed and folding the flat load beam member to form the headlift. In one embodiment, the method includes folding first and second sides of the flat load beam member from a proximal end to a distal end of the headlift to form first and second rails. A portion of each of the first and second rails is folded to form a transversely extending cross member between the first and second rails. The portions of the cross member formed from the first and second rails are then attached. In another embodiment, the method includes folding first and second sides of the flat load beam member from a proximal end to a distal end of the headlift to form first and second rails and attaching the first and second rails to a portion of the distal end of the load beam.

In a sixth embodiment, the present invention provides a method of manufacturing a headlift on a distal end of a load beam of the type for use in a disk drive suspension. The method includes providing a flat load beam member from which the headlift can be formed. The flat load beam member includes a base portion of the headlift and an upper portion of the headlift. The upper portion of the headlift is folded onto the lower portion of the headlift and the upper portion of the headlift is secured to the lower portion.

DETAILED DESCRIPTION OF THE PREFERRED EMBODIMENTS

Figure 1:
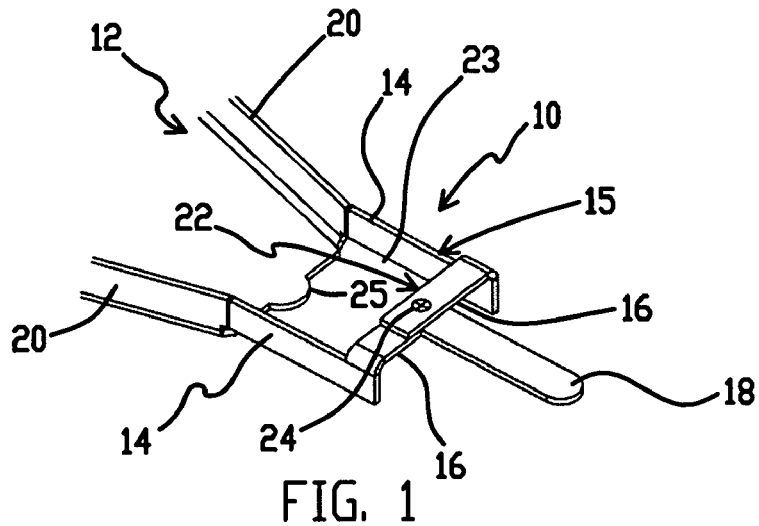
FIG. 1 is an isometric view of the distal end of a suspension load beam having a headlift in accordance with a first embodiment of the present invention.

A headlift 10 in accordance with a first embodiment of the present invention is illustrated in FIG. 1. As shown, headlift 10 is formed on the distal end of a loadbeam 12 from the same material (e.g., stainless steel) as the loadbeam. The headlift 10 includes a pair of headlift rails 14, a pair of transverse connecting arms 16, and a headlift tab 18. Each headlift rail 14 is integral with a loadbeam rail 20 on the loadbeam 12, and extends distally from the end of the loadbeam. Connecting arms 16 extend transversely from the distal ends of each of the headlift rails 14 and engage each other to form a cross member 22. The headlift rails 14 and cross member 22 form a support portion 15 for the headlift tab 18. The support portion 15 is a frame-type structure having a bonding opening 23 that provides access to substantial portions of a flexure tongue (not shown), including those portions corresponding to conductor terminal pads of the flexure (not shown) mounted to the loadbeam 10. In the illustrated embodiment, the connecting arms 16 are joined by a weld 24 to form cross member 22. The headlift tab 18 extends distally from the cross member 22. A load point structure such as dimple 25 is formed on the end of the loadbeam 12 adjacent to the headlift 10. Loadpoint structures such as dimple 25 are generally known and typically cooperate with a slider mounting tab of a flexure (not shown) that is mounted to the load beam.

Figure 2A:
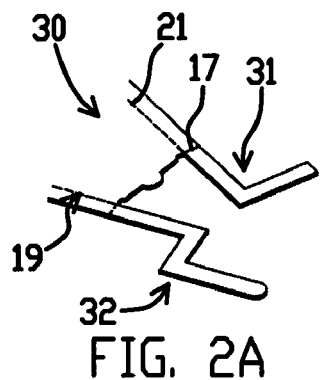
FIG. 2A is an illustration of a portion of a flat loadbeam member from which the loadbeam and headlift shown in FIG. 1 can be manufactured.
Figure 2B:
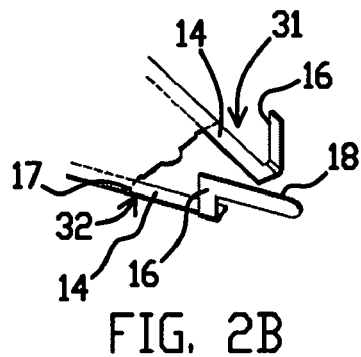
FIGS. 2B-2E illustrate a sequential set of forming operations by which the flat loadbeam member shown in FIG. 2A can be formed into the loadbeam and headlift shown in FIG. 1.
Figure 2C:
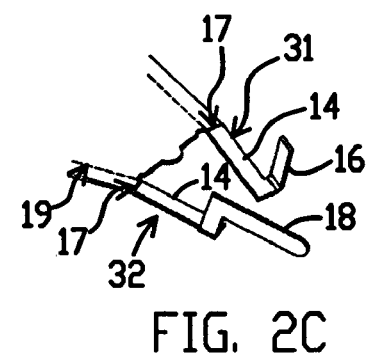
Figure 2D:
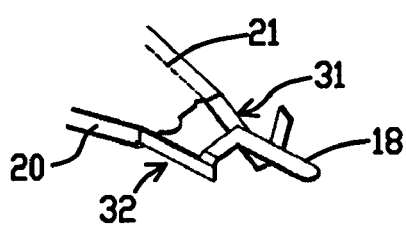
Figure 2E:
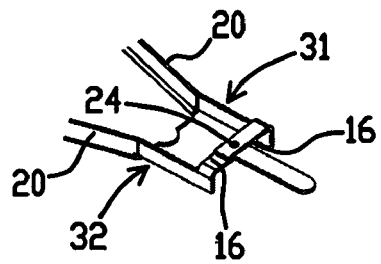

FIG. 2A is an illustration of a flat loadbeam member 30 having arms 31 and 32 from which headlift 10 can be manufactured. Loadbeam member 30 can be manufactured by conventional or otherwise known processes such as photolithography and etching processes. FIGS. 2B-2E illustrate a sequential set of forming operations by which member 30 is formed into loadbeam 12 and headlift 10. As shown in FIG. 2B, arms 31 and 32 are folded (upwardly in the illustration) approximately 90° at locations corresponding to the intersections of headlift rails 14 and connecting arms 16. FIG. 2C shows each of the headlift rails 14 folded (downwardly in the illustration) at phantom lines 17, which correspond to their intersections with the loadbeam rails 20. The headlift rails 14 are folded by an amount that will cause them to have the desired angular orientation with the longitudinal axis of the loadbeam in the completed headlift 10. FIG. 2D shows a portion of arm 32 folded (upwardly in the illustration) approximately 90° at phantom line 19, which corresponds to the intersection of the loadbeam rail 20 integral to arm 32 and the larger planar portion of member 30. Because arm 32 is integral with the portion of member 30 corresponding to the loadbeam rail 20, headlift rail 14, connecting arm 16, and tab 18 are also rotated and oriented by the forming step shown in FIG. 2D. Similarly, and as shown in FIG. 2E, the portion of the member 30 integral with arm 31 is folded (upwardly in the illustration) approximately 90° at phantom line 21. The headlift rail 14 and connecting arm 16 on the arm 31 are rotated and oriented so that the connecting arms 16 of arms 31 and 32 intersect one another. In the illustrated embodiment, the connecting arms 16 are colinear and transverse to the longitudinal axis of the loadbeam 12. While arms 16 are joined by weld 24 in the illustrated embodiment, other approaches for mechanically joining the arms, such as an adhesive, can be used in other embodiments (not shown). Conventional forming operations can be used to fold the loadbeam member 30 into the configuration of headlift 10 shown in the illustrated embodiment.

Headlift rails 14 are generally aligned parallel to each other in the embodiment shown in FIGS. 1 and 2A-2E. In other embodiments (not shown), the rails have other orientations, such as colinear with the load beam rails 20. Although the headlift tab 18 extends from the center of cross member 22, it can be located at other positions on the cross member 22 between headlift rails 14. In still other embodiments (not shown), the headlift 10 is formed from one or more elements separate from the material of the loadbeam 12, and mounted to the loadbeam by welds or other attachment structures or methods.

Headlift 10 offers a number of important advantages. The width of the suspension assembly can be minimized while providing a bonding window through which a solder, gold ball or other bonding tool can be used to bond sliders (not shown) to flexures (not shown) mounted to loadbeams such as 12. Forming the headlift 10 from multiple forms of flat protrusions enhances stiffness and therefore resonance performance. The leading edge of the load beam 12 need only be as wide as the bonding opening 23, thereby improving resonance performance.

Figure 3:
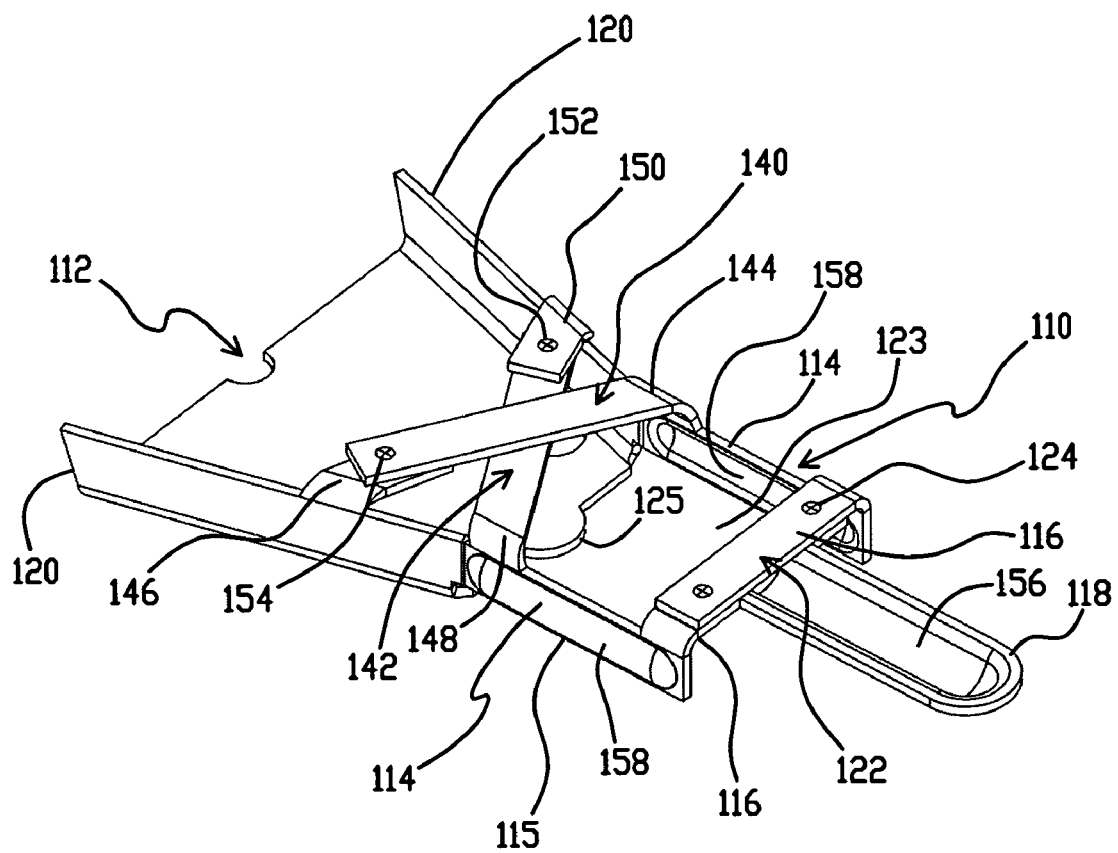
FIG. 3 is an isometric view of the distal end of a suspension load beam having a headlift in accordance with a second embodiment of the present invention.

A headlift 110 in accordance with a second embodiment of the present invention is illustrated in FIG. 3. Headlift 110 has many features similar to that of headlift 10 described above, and similar structural features are identified by common reference numbers in the "1xx" series. As shown, headlift 110 is formed on the distal end of a loadbeam 112 from the same material (e.g., stainless steel) as the loadbeam. The headlift 110 includes a pair of headlift rails 114, a pair of transverse connecting arms 116, and a headlift tab 118. Headlift rails 114 are integral with the loadbeam rails 120 on the loadbeam 112, and extend distally from the end of the load beam. Connecting arms 116 extend transversely from the distal ends of the headlift rails 114 and engage each other to form a cross member 122. In the illustrated embodiment, the connecting arms 116 are longer than the arms 16 of headlift 10, overlap one another by a greater amount, and are joined by a pair of welds 124. The headlift tab 118 extends distally from the cross member 122. The headlift rails 114 and cross member 122 effectively form a support for the headlift tab 118. A load point structure such as dimple 125 is formed on the end of the loadbeam 112 adjacent to the headlift 110.

Headlift 110 and loadbeam 112 also includes a pair of cross members 140 and 142 located near the distal end of the loadbeam 112 and a proximal end of headlift 110. Cross member 140 is formed from connecting arms 144 and 146, and cross member 142 is formed from connecting arms 148 and 150. As shown, connecting arms 144 and 148 extend proximally from the headlift rails 114 and diagonally toward the connecting arms 146 and 150, respectively. In the embodiment shown, connecting arms 144 and 148 extend from a location at the proximal end of headlift rails 114. Connecting arms 146 and 150 extend distally from the loadbeam rails 120 and diagonally with respect to the longitudinal axis of the loadbeam 112 toward the connecting arms 144 and 148, respectively. Connecting arms 144 and 146 overlap and are secured together by, for example, a weld 154. Similarly, connecting arms 148 and 150 overlap and are secured together by a weld 152. As shown, the cross members 140 and 142 cross each other.

Headlift 110 also has a recess or formed trough 156 in the headlift tab 118. Recesses or formed troughs 158 are also present located in the headlift rails 114. Troughs 156 and 158 enhance the stiffness of the headlift tab 118 and headlift rails 114, respectively, and reduce the need for out-of-plane welds and thereby simplify manufacturing. Conventional or otherwise known methods can be used to form the troughs 156 and 158.

Figure 4:
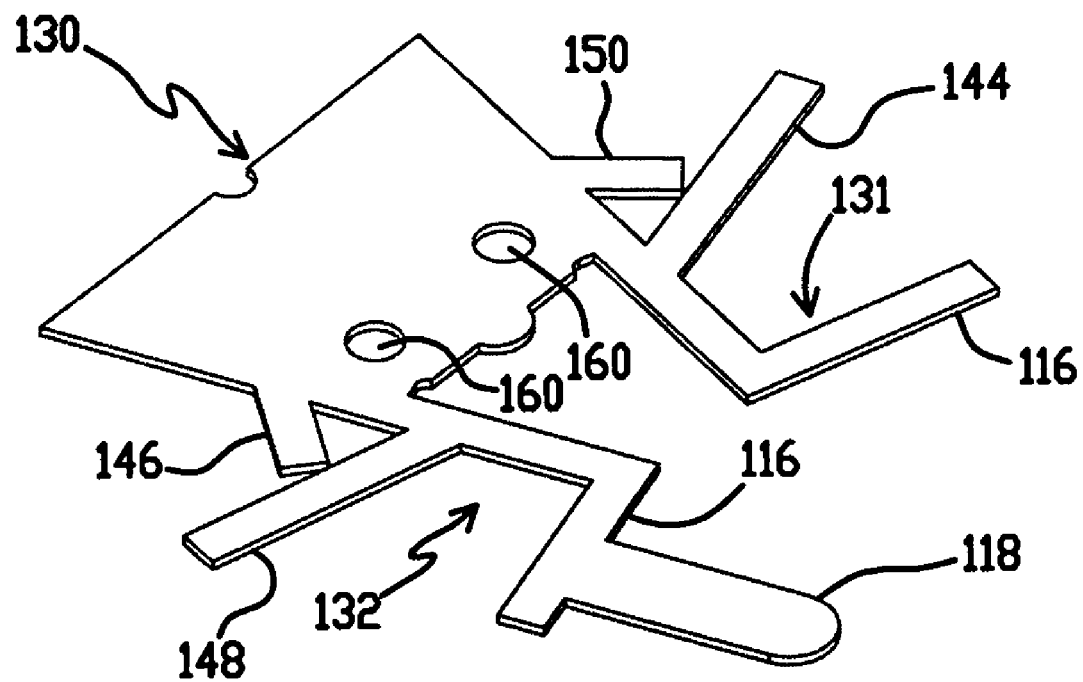
FIG. 4 is an illustration of a portion of a flat loadbeam member from which the loadbeam and headlift shown in FIG. 3 can be manufactured.

FIG. 4 is an illustration of a flat loadbeam member 130 from which headlift 110 and loadbeam 112 can be manufactured. Flat loadbeam member 130, in the illustrated embodiment, has arms 131 and 132, which are similar to arms 31 and 32 of the loadbeam member 30 described above, and can be folded in a similar manner to form the loadbeam 112 and headlift 110. As shown, the arms 131 and 132 also include members corresponding to the connecting arms 144 and 148. Similarly, member 130 includes members corresponding to the connecting arms 146 and 150. In one embodiment, the members corresponding to the arms 144 and 150 can be folded during the same manufacturing operation that folds the member corresponding to the connecting arm 116 on arm 131. Similarly, the members corresponding to the arms 146 and 148 can be folded during the same manufacturing operation that folds the member corresponding to the connecting arm 116 on arm 132. Member 130 also includes holes 160, which are located to enable sufficient access to make welds 152 and 154 to form cross members 140 and 142. Troughs 156 and 158 (not shown in FIG. 4) can (but need not be) formed in the loadbeam member 130 before the member is folded to form headlift 110 and loadbeam 112.

Figure 5:
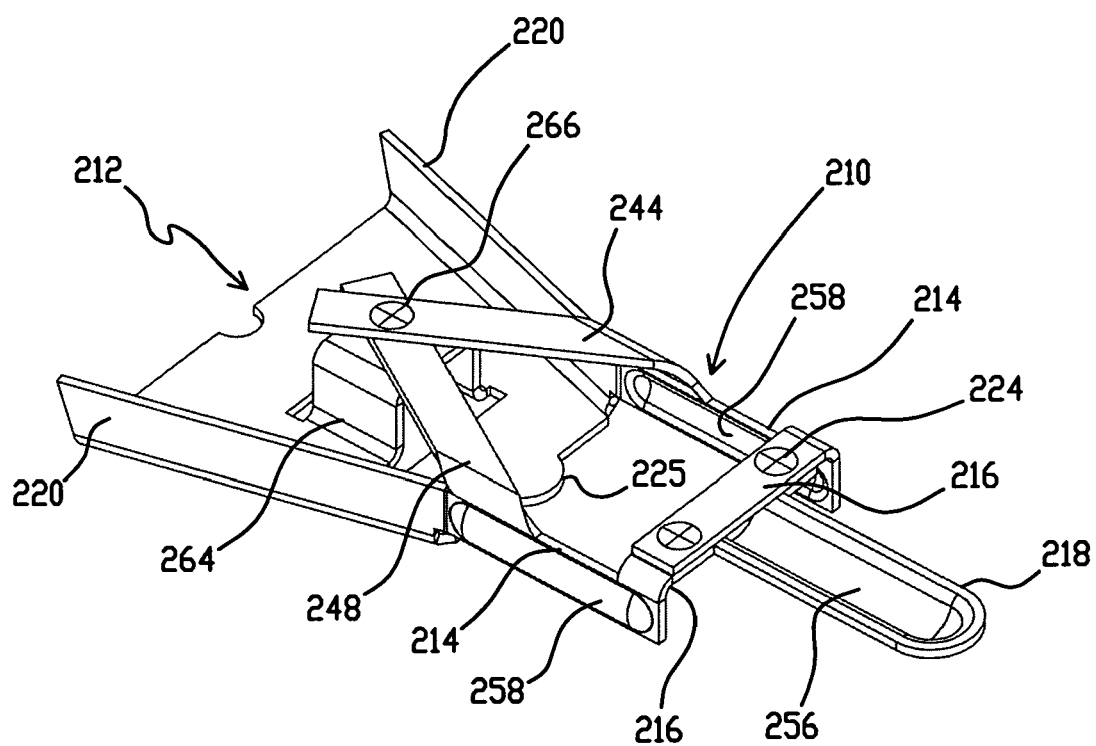
FIG. 5 is an isometric view of the distal end of a suspension load beam having a headlift in accordance with a third embodiment of the present invention.

A headlift 210 in accordance with a third embodiment of the present invention is illustrated in FIG. 5. Headlift 210 can be substantially similar to headlift 110 described above, and identical or similar structural features are identified by similar reference numbers in the "2xx" series. As shown, headlift 210 is formed on the distal end of a loadbeam 212 from the same material (e.g., stainless steel) as the loadbeam. Headlift 210 and loadbeam 212, however, do not include arms similar to arms 146 and 150 of the embodiment shown in FIG. 3. Instead, arms 244 and 248 extend proximally and diagonally from headlift rails 214 so that they intersect over a formed offset 264. In the illustrated embodiment, the offset 264 has a height generally equal to that of loadbeam rails 220. The arms 244 and 248 are attached to each other and the formed offset 264 by a structure or method such as weld 266. The formed offset 264 is manufactured from the same material and is integral to loadbeam 212. In other embodiments (not shown), the offset 264 has other shapes and can be made from a separate piece of material and mounted to the loadbeam 212. Conventional or otherwise known forming methods can be used to form the offset 264.

Figure 6:
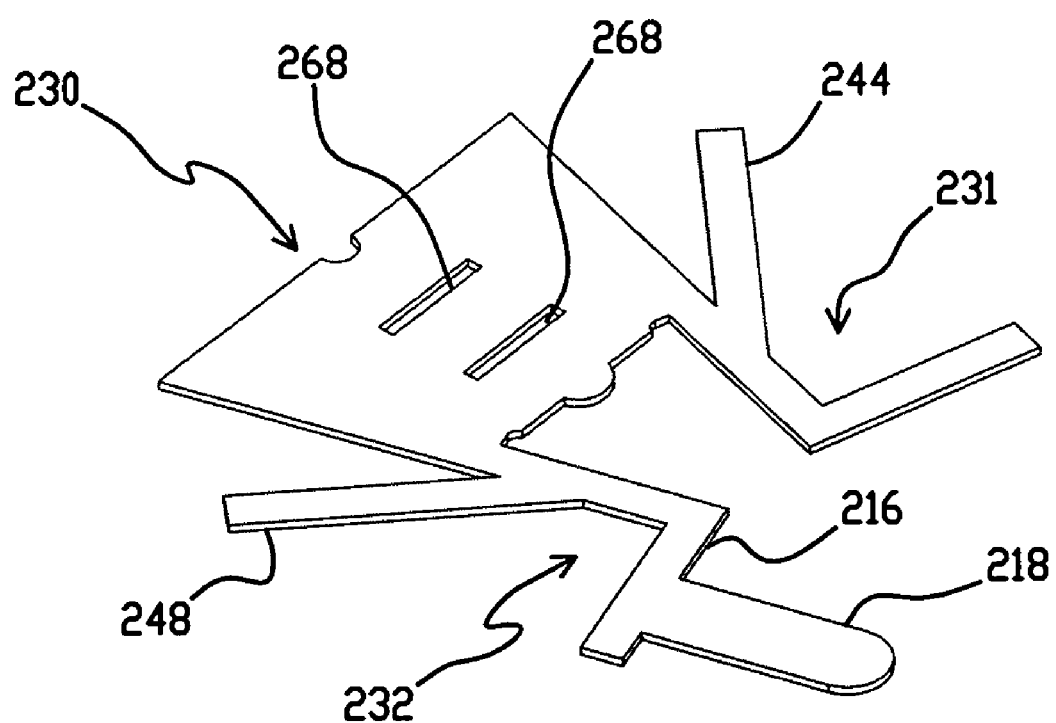
FIG. 6 is an illustration of a portion of a flat loadbeam member from which the loadbeam and headlift shown in FIG. 5 can be manufactured.

FIG. 6 is an illustration of a flat loadbeam member 230 from which headlift 210 and loadbeam 212 can be manufactured. Flat loadbeam member 230, in the illustrated embodiment, has arms 231 and 232, which are similar to the arms 131 and 132 of the loadbeam member 130 described above. Flat loadbeam member 230 can be folded in a similar manner as loadbeam member 130 to form the loadbeam 212 and headlift 210. As shown, a pair of slots 268 are formed in the loadbeam member 230 at the desired location of the formed offset 264 (not shown in FIG. 6). The slots 268 can facilitate the manufacture of the formed offset 264.

Figure 7:
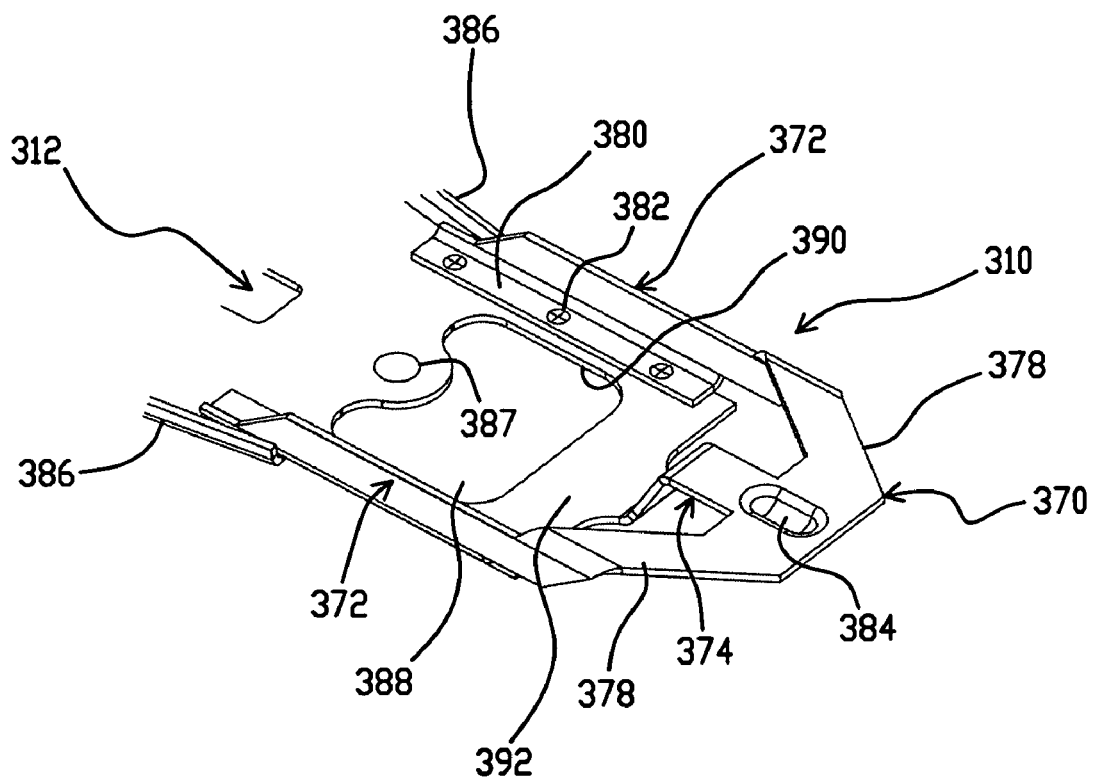
FIG. 7 is an isometric view of the distal end of a suspension load beam having a headlift in accordance with a fourth embodiment of the present invention.

A headlift 310 in accordance with yet another embodiment of the invention is illustrated in FIG. 7. As shown, the headlift 310 is formed on the distal end of a loadbeam 312 from the same material (e.g., stainless steel) as the loadbeam. The headlift 310 includes a generally transverse cross member 378 that is mounted and secured to the distal end of the load beam 312 by headlift rails 372 and center support member 374. The headlift cross member 378 extends to the distal ends of the headlift rails 372 and includes an integral headlift tab 370 located in the center of the cross member 378. Headlift rails 372 extend along the sides of the distal end of the loadbeam 312. In the illustrated embodiment, the headlift rails 372 have mounted tabs or flanges 380 that are attached to the loadbeam 312 by welds 382. The center support member 374 extends between headlift tab 370 and the distal end of the loadbeam 312, and has an "S" form profile shape to span the z-height difference between the loadbeam and headlift tab. A trough 384 is located in the headlift tab 370, and in the illustrated embodiment also extends into a portion of the center support member 374.

The distal end of the loadbeam 312 shown in FIG. 7 has a bonding opening 388 bordered by side members 390 and transverse end member 392. Loadbeam rails 386 are also formed on portions of loadbeam 312 proximal to the bonding opening 388. In the illustrated embodiment shown in FIG. 7, the rail flanges 380 of the headlift 310 are located substantially on the side members 390, with the proximal ends of the headlift rails 372 overlapping the distal ends of the loadbeam rails 386. A load point structure such as dimple 387 is located on the loadbeam 312, and is positioned adjacent to the proximal end of the bonding opening 388 in the embodiment shown in FIG. 7. The illustrated embodiment of headlift 310 is integral with and manufactured from the same piece of material as the loadbeam 312. In other embodiments (not shown), the headlift 310 can be manufactured as a separate element and welded or otherwise attached to the loadbeam 312.

Figure 8:
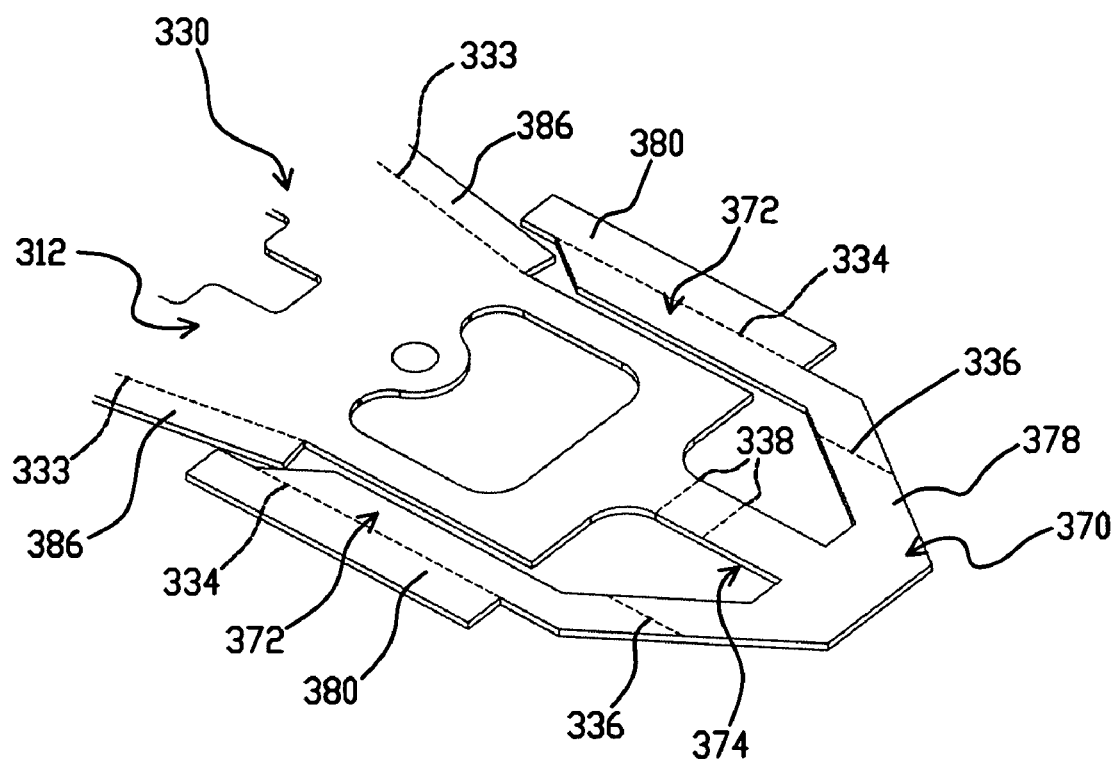
FIG. 8 is an illustration of a portion of a flat loadbeam member from which the loadbeam and headlift shown in FIG. 7 can be manufactured.

FIG. 8 is an illustration of a portion of a flat loadbeam member 330 from which the loadbeam 312 and headlift 310 illustrated in FIG. 7 can be manufactured. Conventional or otherwise known forming processes can be used to manufacture the loadbeam 312 and headlift 310 from member 330. Phantom lines 333 show the location of folds at which the loadbeam rails 386 can be formed. Phantom lines 334 show the location of folds at which the headlift rails 372 can be formed out of the plane of the mounting flanges 380. Phantom lines 336 show the location of folds at which the headlift cross member 378 intersects the headlift rails 372. Phantom lines 338 show the location of folds that can be used to make the profile shape of center support member 374.

Figure 9:
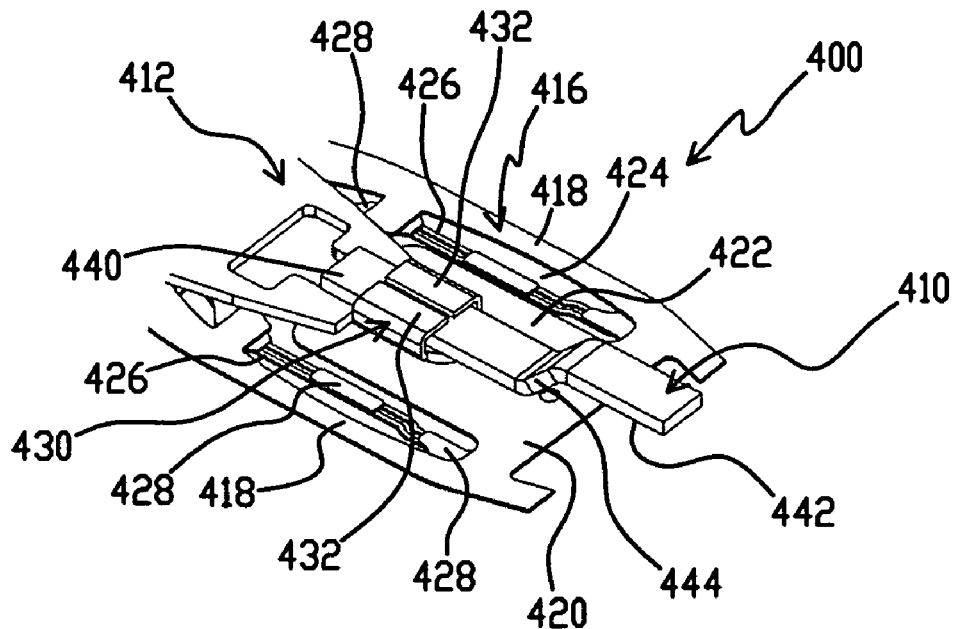
FIG. 9 is an illustration of the distal end of a suspension having a loadbeam and headlift in accordance with a fifth embodiment of the present invention.

FIG. 9 is an illustration of the distal end of a suspension 400 having a loadbeam 412 and headlift 410 in accordance with a sixth embodiment of the present invention. As shown, the suspension 400 also includes an integrated lead or wireless flexure 416 mounted to the loadbeam 412. Flexures such as 416 are well known and commercially available. Flexure 416 of the illustrated embodiment includes a pair of side spring arms 418 connected to a cross member 420 located at its distal end. A tongue 422 having a slider mounting region on the side opposite that facing the loadbeam 412 extends proximally from the cross member 420 into an opening 424 bordered by the side spring arms 418 and the proximal portion of the flexure 416. The flexure 416 also has conductors 426 that extend from the slider mounting region of the tongue 422 toward the proximal portion of the flexure 416. Portions of the conductors 426 that traverse the cross member 420, tongue 422, and other portions of the flexure 416 formed from conductive material (e.g., stainless steel) are separated from the conductive material by dielectric insulating material 428. In the illustrated embodiment, portions of the conductors 426 extending over the opening 424 are covered by sections of insulating material 428.

The loadbeam 412 includes a headlift mount 430 located on its distal end. In the illustrated embodiment, mount 430 is a tubular structure formed by a pair of tabs 432 that extend from the material of the loadbeam 412. The tabs 432 are formed during manufacture into a tubular structure of mount 430, with the opening of the mount extending along a central longitudinal axis of the loadbeam 412. The illustrated embodiment of mount 430 can be manufactured by conventional forming methods.

Headlift 410 is an elongated beam member having a proximal section 440 sized and configured to be received by the mount 430. A distal portion 442 of the headlift 410 extends beyond the distal end of the flexure 416 when the proximal portion 440 is engaged with the mount 430. In the embodiment shown, the distal portion 442 includes an offset region 444, which spaces the distal portion in the z-height direction away from the surfaces of the loadbeam 412 and flexure 416.

As noted above, the headlift mount 430 can be formed in a conventional manner during the manufacture of the loadbeam 412. A head slider (not shown) can be mounted to the tongue 422 of the flexure 416, and electrical terminals of the slider electrically connected to the conductors 426 without interference from the headlift 410. Gold ball bonding or other known or conventional methods can be used to electrically interconnect the slider and conductors 426. Mounting and electrically interconnecting the head slider is sometimes known as the head gimbal assembly (HGA) process. The headlift 410 can be attached and secured to the mount 430 of the loadbeam 412 after the HGA process. In the embodiment shown in FIG. 9, for example, the headlift 410 can be slid into the mount 430 and the tabs 432 forced into frictional engagement with the headlift. Other structures and methods for mounting headlift 410 can also be used. Suspension 400 and the mounting method described herein reduce or eliminate the need for a bonding window in the loadbeam 412, thereby enhancing the resonance characteristics of the suspension.

The need for windows or openings in the loadbeam 412 to facilitate the ball bonding process can therefore be eliminated. Since ball bonding windows can significantly and detrimentally affect the resonance frequencies of the suspension 400, the post-HGA headlift mounting process facilitated by the headlift 410 and loadbeam 412 offers important advantages. In applications where the headlift 410 is used only for merging the suspension 400 into the disk drive during manufacture, portions or all of the headlift 410 can be removed from the suspension following the merge operation.

Figure 10:
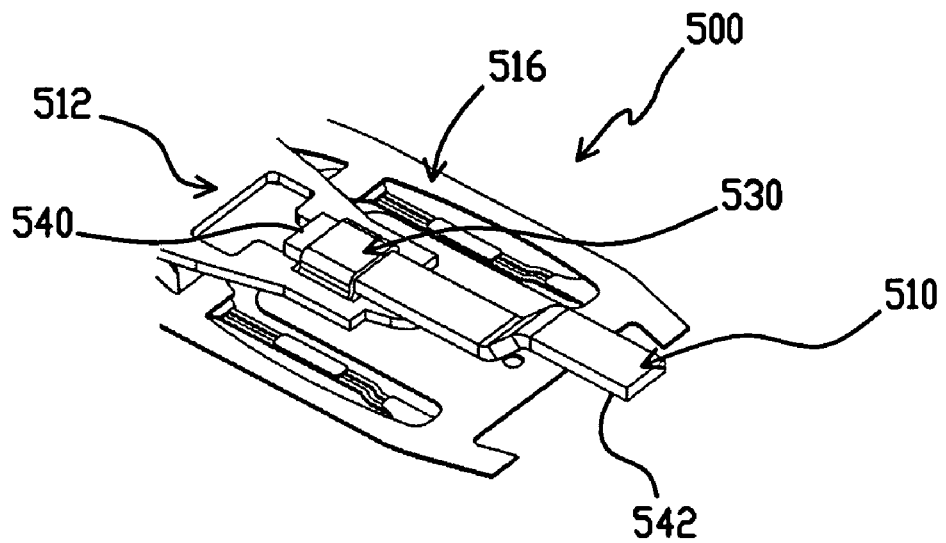
FIG. 10 is an illustration of the distal end of a suspension having a loadbeam and headlift in accordance with a sixth embodiment of the present invention.

FIG. 10 is an illustration of the distal end of a suspension 500 having a loadbeam 512, headlift 510 and flexure 516 in accordance with a another embodiment of the present invention. Suspension 500 can be substantially similar to suspension 400 described above, and identical or similar features are identified by similar reference numbers in the "5xx" series. Suspension 500 includes a headlift mount 530 that is formed as a unitary one-piece element from the material of the loadbeam 512. Other than these differences in the headlift mount 530, suspension 500 can be substantially the same or similar to the suspension 400 described above.

Figure 11A:
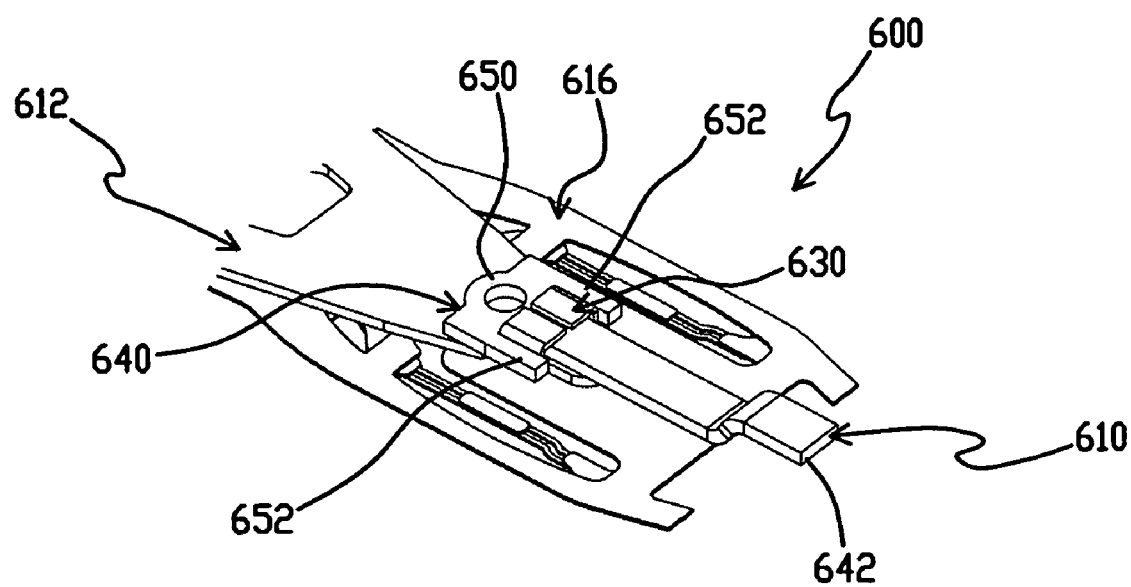
FIG. 11A is an illustration of the distal end of a suspension having a loadbeam and headlift in accordance with a seventh embodiment of the present invention, with the headlift tab shown in its operative position.
Figure 11B:
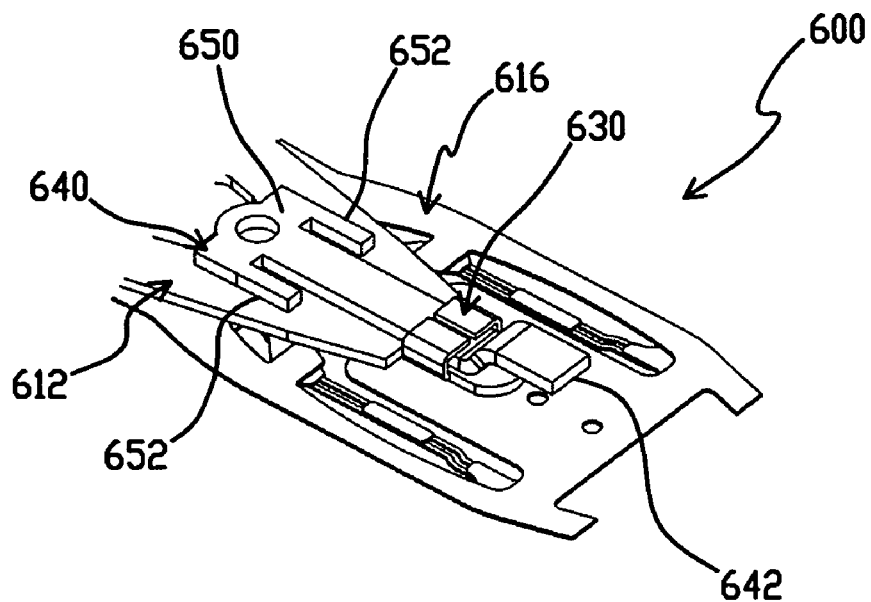
FIG. 11B is an illustration of the suspension shown in FIG. 11A, with the headlift tab shown in its retracted position.

FIGS. 11A and 11B are illustrations of the distal end of a suspension 600 having a loadbeam 612, headlift 610 and flexure 616 in accordance with another embodiment of the present invention. Suspension 600 can be substantially similar to suspension 400 described above, and identical or similar features are identified by similar reference numbers in the "6xx" series. The proximal portion 640 of headlift 610 has a structure such as end member 650 that is sufficiently larger than the opening in the headlift mount 630 to function as a stop member that limits the extent of motion of the headlift in the distal direction. The embodiment headlift 610 shown in FIGS. 11A and 11B also has a pair of side legs 652 for engaging the outer surface of the mount 630. The headlift 610 is shown in its operative position in FIG. 11A, with the end member 650 and legs 652 engaged with the headlift mount 630 and distal portion 642 extending from the distal end of the suspension 600. Other than these differences in the headlift 610, suspension 600 can be substantially the same or similar to the suspension 500 described above.

An advantage of suspension 600 is that it can be manufactured with the headlift 610 movably engaged with the mount 630. During the HGA process the headlift 610 can be located at the retracted position shown in FIG. 11B at which the distal end 642 and other portions of the headlift are clear of the space adjacent to the flexure 616 used to provide access for the ball bonding process. After completion of the ball bonding process, the headlift 610 can be moved to the operative position shown in FIG. 11A and secured to the operative position. In one embodiment of the invention, the headlift 610 is secured by adhesive applied between the headlift and loadbeam 612. Alternative structures and processes (not shown) can also be used to secure the headlift 610.

Figure 12A:
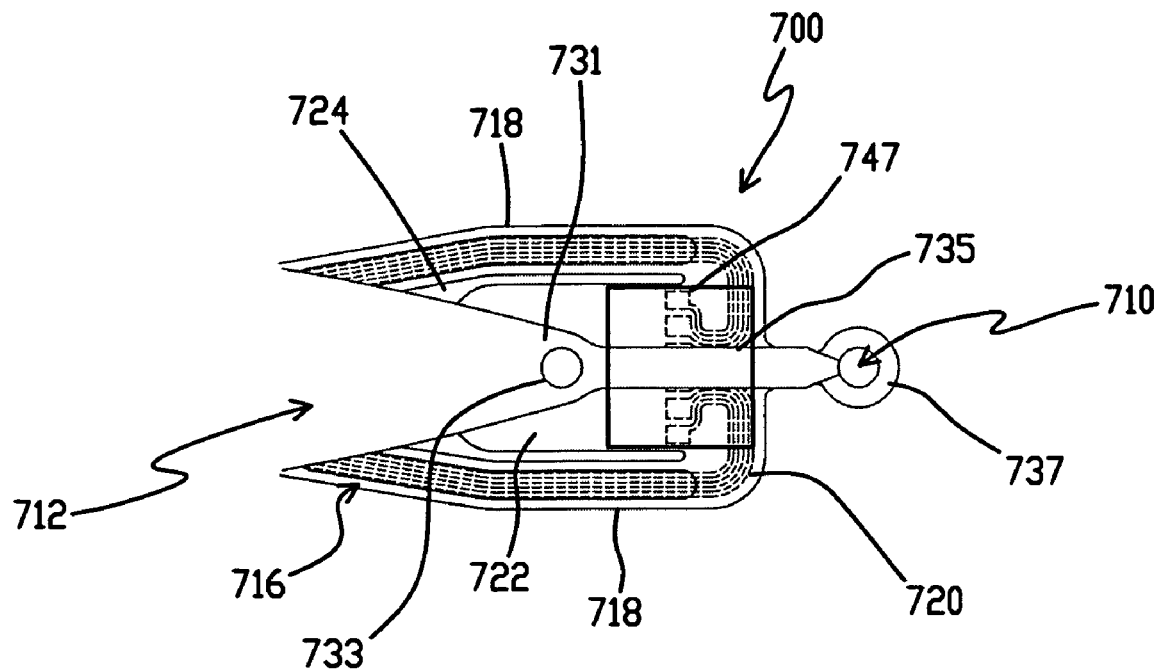
FIG. 12A is an illustration of the distal end of a suspension having a loadbeam, headlift, and a flexure in accordance with an eighth embodiment of the present invention, shown from the loadbeam side of the suspension.
Figure 12B:
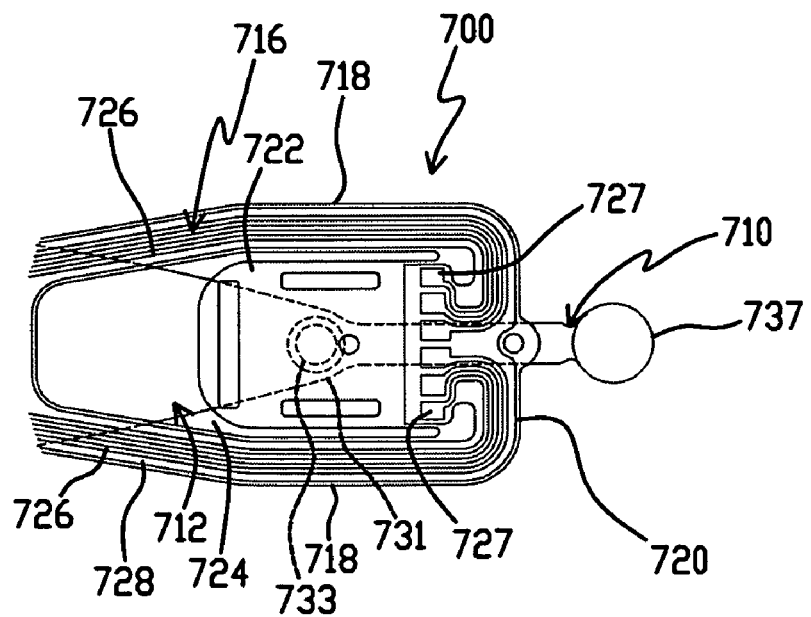
FIG. 12B is an illustration of the suspension shown in FIG. 12A, shown from the flexure side of the suspension.

FIGS. 12A and 12B are illustrations of a portion of a suspension 700 having a loadbeam 712, headlift 710 and flexure 716 in accordance with another embodiment of the present invention. Suspension 700 is shown from the loadbeam side in FIG. 12A and from the flexure side in FIG. 12B. Flexure 716 of the illustrated embodiment includes a pair of side spring arms 718 connected to a cross member 720 located at its distal end. A tongue 722 having a slider mounting region on the side opposite that facing the loadbeam 712 (i.e., on the side shown in FIG. 12B) extends proximally from the cross member 720 into an opening 724 bordered by the side spring arms 718 and the proximal portion of the flexure 716. The flexure 716 also has conductors 726 that extend from terminal pads 727 on the slider mounting region of the tongue 722 toward the proximal portion of the flexure 716. Portions of the conductors 726 that traverse the cross member 720, tongue 722, and other portions of the flexure formed from conductive material (e.g., stainless steel) are separated from the conductive material by dielectric insulating material 728.

Figure 13A:
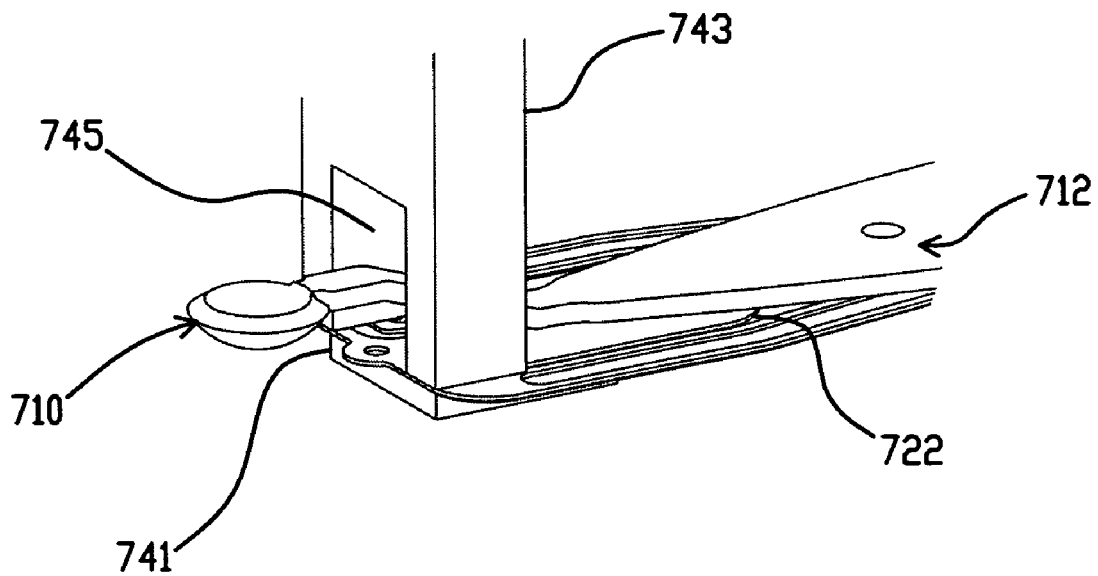
FIGS. 13A and 13B are illustrations of the suspension shown in FIGS. 12A and 12B positioned within a bonding tool.
Figure 13B:
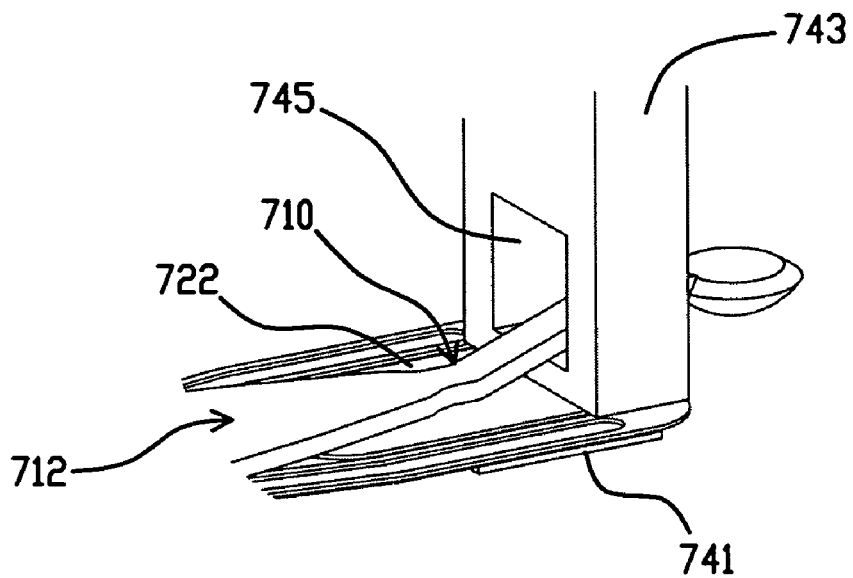

As shown, the distal end of loadbeam 712 tapers toward a tip 731 located over the tongue 722 and has a load point structure such as dimple 733 that engages the tongue. The headlift 710 includes a relatively narrow elongated beam member 735 that extends distally over the tongue 722 from the loadbeam tip 731. As shown in FIGS. 13A and 13B, the beam member 735 can be formed to offset the headlift tab 737 in the z-height direction from the surface of the flexure 716. A headlift tab 737 is located on the distal end of the beam member 735, at a location distal of the distal end of the flexure 716. In the embodiment shown, the headlift tab 737 is formed so as to be wider than the beam member 735, and to have an offset away from the surface of the beam in the direction toward the flexure 716. Although formed as a dimple-shaped structure in the illustrated embodiment, the headlift tab 737 can have other shapes in other embodiments (not shown). Furthermore, although the beam member 735 has a width that allows the complete exposure of at least four terminal pads 727 in the illustrated embodiment, beams having greater or lesser widths that provide the functional advantages of the invention can also be used.

FIGS. 13A and 13B illustrate the suspension 700 with a slider 741 mounted to the tongue 722 and positioned with respect to a bonding tool 743 that can be used to perform the HGA process. As shown, the distal end of the headlift 710, including the tab 737 and at least portions of the beam member 735, are sized to extend into a slot 745 in the bonding tool 743, while enabling the bonding tool to be positioned to effectively perform the ball bonding operation. In effect, the z-height offset of the beam member 735 causes the structure to be positioned above the flexure terminal pads, enabling the bonding tool to straddle the headlift 710. The outline 747 in FIG. 12A shows the footprint of the bonding tool 743 on the flexure 716 during the bonding operation. As shown, the bonding tool 743 is located over all of the terminal pads 727, thereby enabling all the terminals (not shown) on the slider 741 to be bonded to the terminals on the flexure 716. This arrangement allows for the simultaneous application of energy to the terminal pads on both sides of the headlift, although a bonding tool that applies energy to only one side of the headlift (not shown) can also be used. Furthermore, no bonding window is needed thereby enhancing suspension resonance performance.

Figure 14:
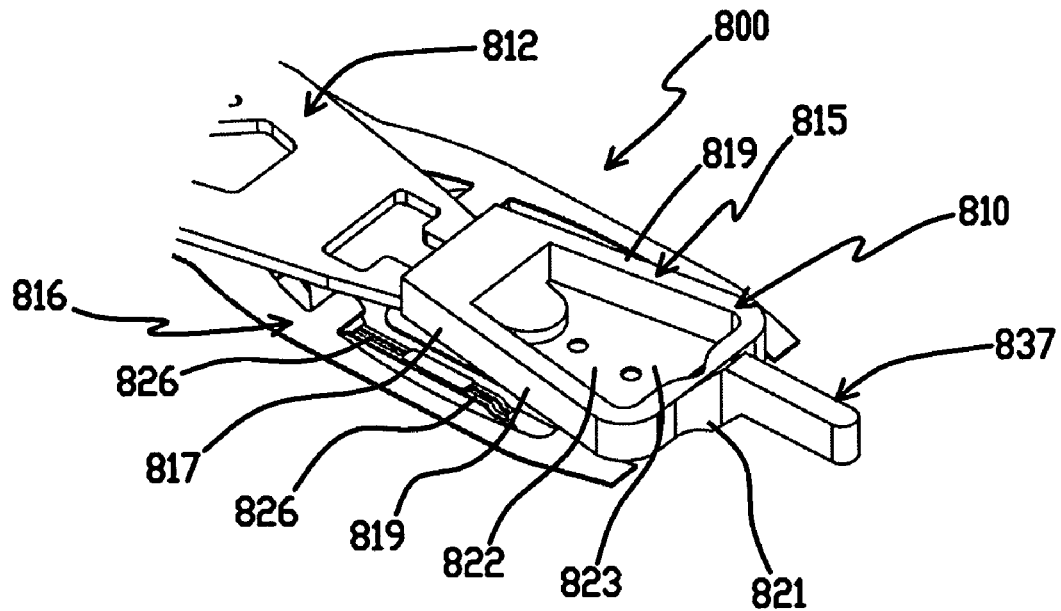
FIG. 14 is an illustration of the distal end of a suspension having a loadbeam and molded polymer headlift in accordance with a ninth embodiment of the present invention.

FIG. 14 is an illustration of the distal portion of a suspension 800 having a headlift 810, loadbeam 812 and flexure 816 in accordance with another embodiment of the present invention. Suspension 800 can be substantially similar to suspension 400 described above in connection with FIG. 9, and identical or similar features are identified by similar reference numbers in the "8xx" series. Headlift 810 is a molded plastic member having a support portion 815 and a headlift tab 837. The support portion 815 has a base member 817 that is mounted to the distal end of the loadbeam 812, a pair of laterally-spaced and generally distally-extending side members 819, and a cross member 821 connecting the distal ends of the side members. The support portion 815 is a frame-type structure having a bonding opening 823 that provides access to substantial portions of the flexure tongue 822, including those portions corresponding to the terminal pads (not visible) of the conductors 826. The headlift tab 837 extends in the distal direction from the cross member 821.

Figure 15:
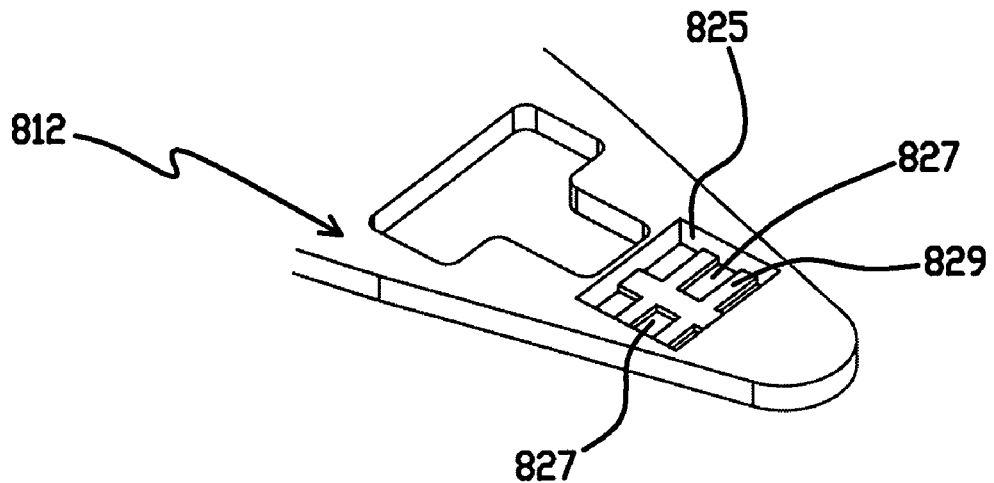
FIG. 15 is an illustration of the distal end of the loadbeam shown in FIG. 14.

Headlift 810 can be formed by injection molding. To enable secure engagement of the headlift 810 with the loadbeam 812, the portion of the distal end of the loadbeam that supports the headlift can be structured as shown in FIG. 15. In the embodiment shown in FIG. 15, the structure includes a recess 825 in the material (typically stainless steel) of the load beam 812, and a plurality of apertures 827 through the recess, effectively forming a recessed grid 829 in the loadbeam. During the injection or other molding processes that can be used to form or mount the headlift 810 to the loadbeam 812, rivets or polymer flowing around the recess 825 and grid 829 lock the headlift in place. Other than these differences in the headlift 810 and loadbeam 812, suspension 800 can be substantially the same or similar to the suspension 600 described above. Because the polymer material from which the Headlift 810 is formed has relatively low mass, the headlift functionality can be obtained with reduced impact on the suspension resonance characteristics.

Figure 16:
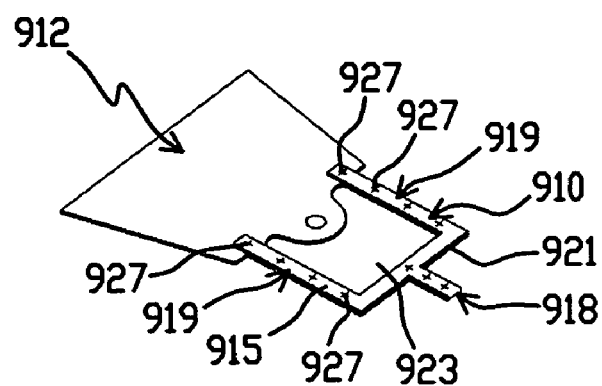
FIG. 16 is an illustration of the distal end of a loadbeam having a headlift in accordance with a tenth embodiment of the present invention.

FIG. 16 is an illustration of a distal portion of a loadbeam 912 having a headlift 910 in accordance with another embodiment of the present invention. Headlift 910 includes a support portion 915 and a headlift tab 918. The support portion 915 includes a pair of laterally-spaced and generally distally extending side members 919 and a cross member 921 connecting the distal ends of the side members. The support portion 915 is a frame-type structure having a bonding opening 923 that provides access to substantial portions of the flexure tongue (not shown), including those portions corresponding to the conductor terminal pads of the flexure (not shown) that is to be mounted to the load beam. The headlift tab 918 extends in the distal direction from the cross member 921.

Figure 18:
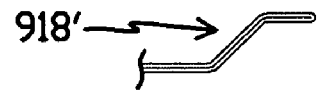
FIG. 18 is an illustration of an alternative embodiment of the headlift tab shown in FIG. 17.
Figure 17:
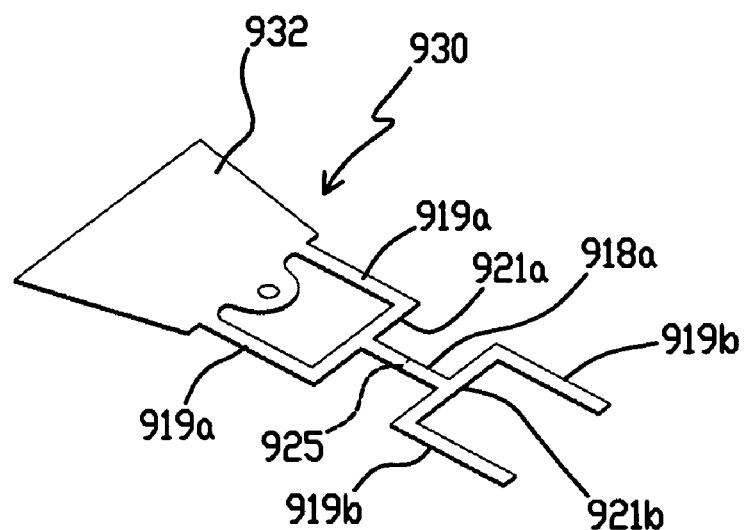
FIG. 17 is an illustration of a portion of a flat loadbeam member from which the loadbeam and headlift shown in FIG. 16 can be manufactured.

FIG. 17 is an illustration of a portion of a flat, one-piece loadbeam member 930 from which the loadbeam 912 and headlift 910 illustrated in FIG. 16 can be manufactured. Conventional or otherwise known processes such as photolithography and etching processes can be used to manufacture the member 930. As shown, member 930 includes a loadbeam portion 932, a first pair of side member sections 919a connected by a cross member section 921a, a tab section 918a, and a second pair of side member sections 919b connected by a cross member section 921b. Member 930 can be folded along the phantom line 925, causing the corresponding sections 919a and 919b, 921a and 921b, and the opposite ends of section 918a, to overlap and form the headlift 910 shown in FIG. 16. In the embodiment shown, sections 919b are longer than corresponding sections 919a so that the ends of sections 919b overlay the loadbeam portion 932. The overlaying sections of 919a and 919b, 921a and 921b, and 918a are then fastened together by welds 927. Similarly, the ends of sections 919b can be welded to the loadbeam portion 932. In other embodiments (not shown), other structures or methods such as adhesives are used as alternatives or in addition to welds 927. Conventional or otherwise known forming operations can be used to manufacture the headlift 910 in this manner. Forming the headlift 910 from two layers of material increases the thickness and therefore strength of the structure. Alternative embodiments of the invention include a formed headlift tab such as 918' shown in FIG. 18. The formed headlift tab 918' can add strength to the structure and provide a z-height offset with respect to the plane of other portions of the headlift.

In general, headlifts in accordance with the invention have relatively low impact on the resonance characteristics of the suspension. They can be used with loadbeams no wider at the dimple than the ball bond window. Headlift stiffness can be enhanced without limiting headlift height. The need for bonding windows can be reduced or eliminated.

Although the present invention has been described with reference to preferred embodiments, those skilled in the art will recognize that changes can be made in form and detail without departing from the spirit and scope of the invention. In particular, all of the described embodiments can be modified in many ways including employing various thicknesses and widths while providing equivalent functionality.

What is claimed is:

1. A headlift on a distal end of a load beam of the type for use in a disk drive suspension and having first and second transversely-spaced load beam rails, the headlift comprising a first headlift rail extending distally from a distal end of the first load beam rail, the first headlift rail in contact and continuous with the first load beam rail;

a second headlift rail transversely spaced from the first headlift rail and extending distally from a distal end of the second load beam rail, the second headlift rail in contact and continuous with the second load beam rail;

a cross member attached to and extending between distal ends of the first and second headlift rails, including a pair of transversely extending and engaged connecting arms and one or more welds joining the connecting arms, each of the connecting arms in contact and continuous with one of the first and second headlift rails; and a tab extending distally from the cross member.

2. The headlift of claim 1, further comprising:

a first arm extending transversely from a proximal portion of the first headlift rail;

a second arm extending transversely from a proximal portion of the second headlift rail and engaging the first arm.

3. The headlift of claim 2, the load beam including an offset that engages with the first and second arms.

4. The headlift of claim 1, wherein the headlift is integrally formed from the same piece of material as the suspension load beam.

5. The headlift of claim 1, further comprising a trough formed into the first and second headlift rails.

6. The headlift of claim 1, wherein the first headlift rail is substantially parallel to the second headlift rail.

7. The headlift of claim 1, the headlift having an offset so that a distal end of the headlift is on a different plane from a proximal end.

* * * * *